Patented July 10, 1951

2,559,673

UNITED STATES PATENT OFFICE 2,559,673

AZO DYES OF THE THIOPHANTHRAQUINONE SERIES

Herman E. Schroeder and Lorraine A. Ringrose, Wilmington, Del., assignors to E. I. du Pont de Nemours & Company, Wilmington, Del., a corporation of Delaware No Drawing. Application June 17, 1949, Serial No. 99,877

4 Claims. (Cl. 260—157)

This invention relates to the preparation of new dyes of the thiophanthraquinone series, and more particularly to diazoles of the following general formula:

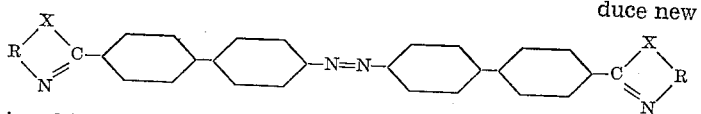

in which X stands for sulfur or oxygen and the R's stand for radicals of the group consisting of thiophanthraquinone, anthraquinone and halogen-substituted thiophanthraquinone and halogen-substituted anthraquinone radicals, at least one R being a radical of the group consisting of the thiophanthraquinone radical and the halogen-substituted thiophanthraquinone radical, the thiophanthraquinone radicals in each case being connected to the azole ring through its benzene nucleus.

It has been recognized for many years that, in the dyes of the anthraquinone series, those in the yellow range are generally deficient in their fastness properties, more particularly with regard to fastness to light, although in general the dyes of the anthraquinone vat dye class are considered to have good fastness properties. Where yellow dyes have been found in the anthraquinone series which have good fastness properties, they are usually either dull or weak tinctorially, and therefore the various dyes in the anthraquinone vat dye class must be selected to answer the particular need at hand, balancing the question of fastness, brightness and tinctorial strength of the particular dyes available. In U. S. Patent 2,175,803 a group of symmetrical dianthraquinonediazoles, more particularly imidazoles, 1,2(N)-thiazoles and 2,1(N)-oxazoles which contain an azo group, are disclosed. These compounds dye vegetable fibers in yellowish shades and are said to exhibit good fastness to chlorine and boiling soap solution, and, in many cases, to light. It has been found, however, that these dyes are deficient in wet fastness, particularly in kier boiling, and in their vat stability. In U. S. Patent 2,228,455 a series of dianthraquinonylimides containing azo groups are disclosed which have relatively good fastness properties, but these dyes have been found to be dull and considerably weaker than the azole types of the first mentioned patent.

It is an object of the present invention to produce new and valuable dyes of the thiophanthraquinone series which dye cotton and related fibers from the usual alkaline hydrosulfite vats in desirable yellow shades and which exhibit improved brightness, tinctorial strength and fastness properties as compared to dyes of similar shade now available. It is a more specific object of the invention to produce thiophanthraquinone vat dyes which are 4″,4‴-substituted-azobiphenyl compounds carrying at least one thiophanthraquinoneazole group.

The compounds of the present invention may be prepared from the azobiphenylcarbonylaminothiophanthraquinonecarbonyl chlorides more particularly disclosed and claimed in our copending application Serial No. 99,874 filed of even date herewith, which have the formula:

I

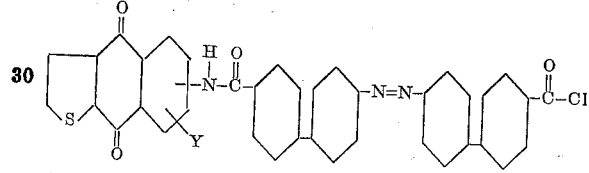

in which Y stands for halogen attached to the benzene ring in a position ortho to the imino group, which are further condensed with aminothiophanthraquinones or aminoanthraquinones to produce the di-condensation products more particularly described and claimed in our copending application Serial No. 99,876, which have the formula:

II

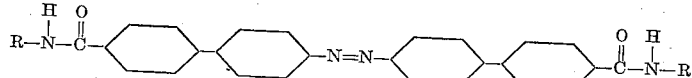

in which at least one R is a thiophanthraquinone radical and the second R may be either the thiophanthraquinone radical or the anthraquinone radical but in which both R's carry a halogen atom in a position ortho to the carbonylimino linkage.

The new azole dyestuffs of this invention may be prepared by the following processes:

(a) Oxazole ring closure of the thiophanthraquinonedi-orthohalogen-diimides of azobiphenyl-dicarboxylic acid of Formula II.

(b) Azole ring closure of the products formed by the condensation of azobiphenylcarbonylimino-thiophanthraquinonecarbonyl chlorides carrying a halogen in a position ortho to the imino group of Formula I, with ortho-mercapto-(or hydroxy)-aminothiophanthraquinones or anthraquinones.

(c) Azole ring closure of the condensation products of the azobiphenyldicarbonyl chloride with 2 moles of ortho-mercapto-(or hydroxy)-aminothiophanthraquinones or with 1 mol of the ortho-mercapto-(or hydroxy)aminothiophan-thraquinone followed by 1 mol of the ortho-mercapto-(or hydroxy)aminoanthraquinone.

(d) The dithiazoles may also be prepared by sulfur fusion of the diimide chlorides which may in turn be prepared from the diimides of Formula II with phosphorous pentachloride in the manner described in British Patent 322,184: Two (2) parts of the diimide of Formula II is heated at 175° C. with 1 part of PCl₅ in 20 parts of ortho-dichlorobenzene or nitrobenzene as solvent until a definite change occurs in crystal structure as observed by microscopic test. After about 4 to 5 hours the reaction is complete. The diimide chloride is filtered from the cooled reaction mass, washed with orthodichlorbenzene and acetone in turn and dried at 40° to 50° C. The dried product, 1 part, is heated with 2 parts of sulfur and 4 parts of naphthalene at 210° C. for about 8 to 10 hours or until no imide chloride remains.

The new dyes of this invention dye vegetable fibers in yellow shades from orange alkaline hydrosulfite vats. The dyeings exhibit unusually good light fastness and tinctorial strength for yellow vat dyes. They exhibit the outstanding advantage over their anthraquinone analogs in that they are printing colors building up to stronger shades than the corresponding dianthraquinone derivatives, are easier to vat, and, in general, show better alkali-fastness properties. The compounds of this invention which contain 2-thiophanthraquinone groups show greater advantage in printing behavior and in strength build-up than those carrying only the one thiophanthraquinone group. The presence of only one thiophanthraquinone radical in these new dye molecules, however, imparts to the dye a very marked improvement in printing behavior and in strength of color to render these new dyes of very practical importance as printing colors.

The following examples are given to illustrate the invention. The parts used are by weight.

*Example 1*

A mixture of 150 parts of dry nitrobenzene, 10 parts of 4,4'-azobiphenyl-4'',4'''-di-(6-carbonyl-amino-5-chlorothiophanthraquinone), 5 parts of soda ash, 5 parts of potassium acetate, 0.15 part of cuprous chloride and 0.08 part of copper acetate was heated at 210°-215° C. for four hours. The charge was filtered at 60° C. and the cake was washed with nitrobenzene, alcohol, water and dried. The 4,4'-azobiphenyl-4'',4'''-bis[5,6(N)-thiophanthraquinone oxazole], as a bright yellow product which was acid pasted and bleached with alkaline hypochlorite by usual methods, is represented by the formula:

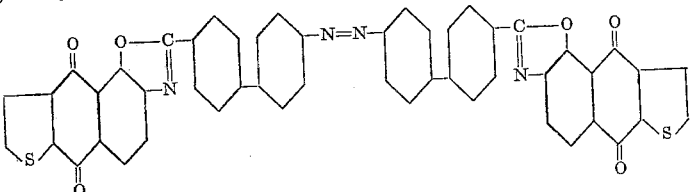

It dissolves in concentrated sulfuric acid to give an orange color and dyes vegetable fibers in yellow shades of excellent light-fastness and strength from an orange alkaline-hydrosulfite vat. It also gives strong yellow prints when applied in the usual manner.

*Example 2*

A mixture of 120 parts of nitrobenzene, 10 parts of 4,4'-azobiphenyl-4''-(6-carbonylamino-5-chloroanthraquinone)-4'''-(2-carbonylamino-1-chloroanthraquinone), 5 parts of potassium acetate, 2.5 parts of soda ash, 0.05 part of cuprous chloride and 0.025 part of copper powder was refluxed (210°-215° C.) for five hours. The charge was filtered at 60° C., and the cake was washed with nitrobenzene, alcohol and water and dried. The 4,4'-azobiphenyl-4''-[5,6(N)-thiophanthraquinone oxazole]-4'''-[1,2(N)-anthraquinone oxazole], as a deep yellow-colored product which was purified through acid pasting and bleaching, is represented by the formula:

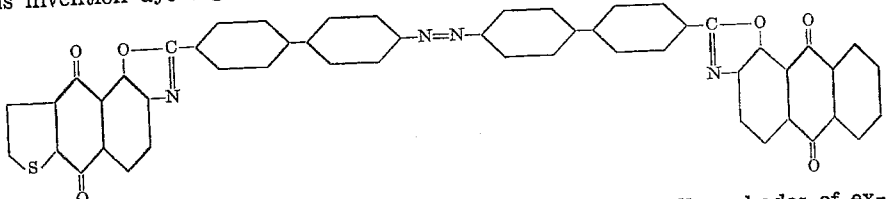

It dyes vegetable fibers in yellow shades of excellent light-fastness and tinctorial strength from an orange alkaline hydrosulfite vat.

*Example 3*

A mixture of 190 parts of nitrobenzene, 4,4'-azobiphenyl - 4'' - (6 - carbonylamino-5-chloro-thiophanthraquinone)-4'''-[1,2(N) - anthraquinone thiazole] (prepared from 11 parts of azo-biphenyldicarbonyl chloride, 6.6 parts of 5-chloro-6-aminothiophanthraquinone and 7.1 parts of the sodium salt of 1-mercapto-2-aminoanthraquinone by the method given in our co-pending application Serial No. 99,878, 9.5 parts of soda ash, 9.5 parts of potassium acetate, 0.28 part of cuprous chloride and 0.28 part of copper acetate was heated at 210°-215° C. for four hours. The charge was filtered at 100° C., and the cake was washed with nitrobenzene, alcohol, water and was dried. The yellow 4,4'-azobiphenyl-4''-[5,6(N) - thiophanthraquinone oxazole] - 4'''-[1,2(N)-anthraquinone thiazole] which was purified through acid pasting and bleaching, is represented by the formula:

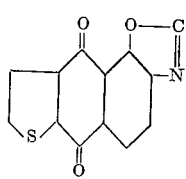

It dyes vegetable fibers in bright red-yellow shades of excellent tinctorial strength from a red-orange alkaline hydrosulfite vat and gives an orange solution in concentrated sulfuric acid.

*Example 4*

A mixture of 200 parts of nitrobenzene, 4,4'-azobiphenyl-4''-(6 - carbonylamino - 5,7 - dibromothiophanthraquinone) - 4''' - (2 - carbonylamino - 1,3 - dibromoanthraquinone) [prepared from 7.8 parts of azobiphenyldicarbonyl chloride, 7 parts of 5,7-dibromo-6 - aminothiophanthraquinone, and 6.8 parts of 1,3-dibromo-2-aminoanthraquinone by the method given in our co-pending application Serial No. 99,876] 9.8 parts of soda ash, 9.8 parts of potassium acetate, 0.3 part of cuprous chloride and 0.3 part of copper acetate was heated at reflux (210–215° C.) for four hours. The charge was filtered at 80° C. and the cake was washed with nitrobenzene, alcohol, water and was dried. The 4,4'-azobiphenyl-4''-[7-bromo - 5,6(N) - thiophanthraquinone oxazole]-4'''-[3-bromo-1,2(N)-anthraquinone oxazole], which was purified through acid pasting and bleaching, is represented by the formula:

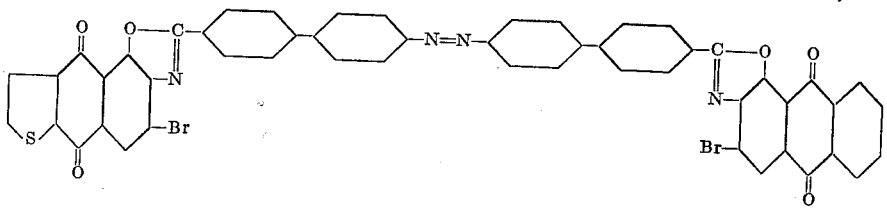

It dyes vegetable fibers in yellow shades from an orange alkaline hydrosulfite vat and gives an orange solution in concentrated sulfuric acid.

*Example 5*

A mixture of 147 parts of dry nitrobenzene, 4,4'-azobiphenyl-4''-(6-carbonylamino-7-bromothiophanthraquinone)-4''' - (2 - carbonylamino-3-bromoanthraquinone) [prepared from 7.5 parts of azobiphenylcarbonyl chloride, 5.3 parts of 6-amino - 7 - bromothiophanthraquinone and 5.2 parts of 2 - amino - 3 - bromoanthraquinone as given in our co-pending application Serial No. 99,876], 8 parts of soda ash, 8 parts of potassium acetate, 0.24 part of cuprous chloride and 0.24 part of copper acetate was heated at 210°–215° C. for four hours. The charge was filtered at 100° C., washed with nitrobenzene, alcohol, water and was dried. The greenish-yellow 4,4'-azobiphenyl-4'' - [6,7(N) - thiophanthraquinone oxazole]-4''' - [2,3(N) - anthraquinone oxazole] is represented by the formula:

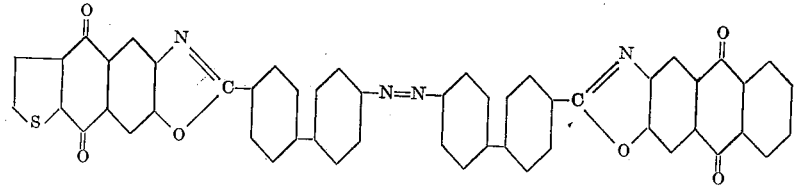

It dyes vegetable fibers in greenish-yellow shades from a yellow-orange alkaline hydrosulfite vat and gives a yellow-orange color in concentrated sulfuric acid.

*Example 6*

To a mixture of 156 parts of dry ortho-dichlorobenzene and 13 parts of 4,4'-azobiphenyl-4'' - (6 - carbonylaminothiophanthraquinone) - 4'''-(2-carbonylaminoanthraquinone) was added 6.8 parts of phosphorous pentachloride at room temperature. The charge was heated at 130° C. for five hours, at 150° C. for one hour, and then filtered cold and the cake washed with ortho-dichlorobenzene, alcohol, ether and was dried. A mixture of 12 parts of the imide chloride described above, 96 parts of naphthalene and 12 parts of sulfur was refluxed at 215° C. about ten hours (until the fusion was completed) and the charge was cooled to 100° C., diluted with 190 parts of xylene, and filtered cold. The cake was washed with xylene, alcohol, and water, and was dried. The yellow 4,4'-azobiphenyl-4''-[5,6(N) - thiophanthraquinone thiazole]-4''' - [1,2(N) - anthraquinone thiazole], which was purified through acid pasting and bleaching is represented by the formula:

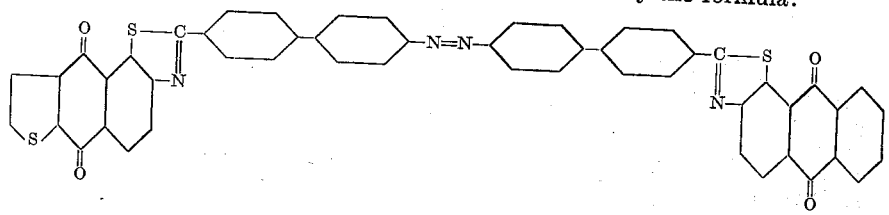

It dyes vegetable fibers in red-yellow shades from an alkaline hydrosulfite vat and gives a yellow solution in concentrated sulfuric acid.

As illustrated in the above examples, the thiophanthraquinone azoles of this invention are readily prepared through routes normally used for the synthesis of azoles. Dioxazoles are prepared by treating a diorthohalogen diamide, preferably an alpha-diorthohalogen diamide with acid binding agents and copper catalysts as described above. Dioxazoles are also obtained by reacting a 4,4'-azobiphenyl-4''-carbonylamino-thiophanthraquinone-4'''-carbonyl chloride containing halogen ortho to the amine with an ortho-aminohydroxythiophanthraquinone or -anthraquinone to form a diimide which is ring closed first by heating with an acidic catalyst and then with acid binding agents and a copper catalyst. Oxazole-thiazoles result from reaction of the same acid chlorides with an ortho-mercaptoamino-thiophanthraquinone or -anthraquinone or with its sodium salt, ring closure being effected as described above.

The condensations and azole ring closures may be carried out under a wide variety of conditions, depending upon the reactants employed. Temperatures in the range of 140°–200° C. are usually used for most of the reactions, although temperatures outside of this range are occasionally necessary. The ring closures are carried out generally in the higher boiling inert organic solvents such as nitrobenzene, trichlorobenzene and naphthalene derivatives, in the presence of the usual catalysts necessary for the type reaction.

If desired, the reactions may be carried out without isolation of intermediate products, e. g., by condensing azobiphenyldicarbonyl chloride with a chloro- or mercapto-aminoanthraquinone, then with a chloroamino- or mercaptoamino-thiophanthraquinone followed by the usual ring closure.

The following valuable dyes may be prepared in the manner illustrated in the specific examples above, following the procedure illustrated for either the oxazoles, thiazoles or the mixed oxazole-thiazole compounds.

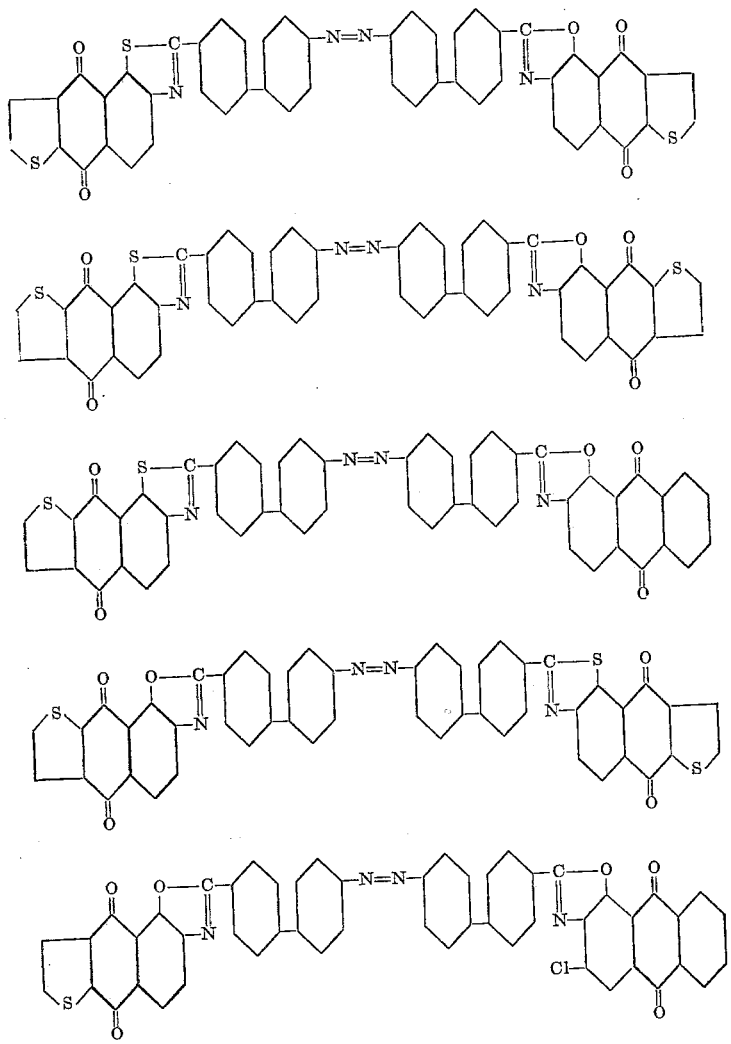

Dithiazoles may be prepared by condensation of azobiphenyldicarbonyl chloride with ortho-mercaptoamino-thiophanthraquinones or -anthraquinones or with the sodium salts, in the first case ring closure being effected by treatment with acidic agents, or in the latter case by heating. Dithiazoles may also be prepared by sulfur fusion of the diimide chlorides.

It will be obvious to those skilled in the art that other combinations of the aminothiophanthraquinones and aminoanthraquinones may be substituted in the above examples to produce the diazole compounds of the present invention, which are all new and valuable vat dyes having very good light fastness, unusual tinctorial strength and good printing properties.

We claim:
1. The azobiphenyldiazoles of the general formula:

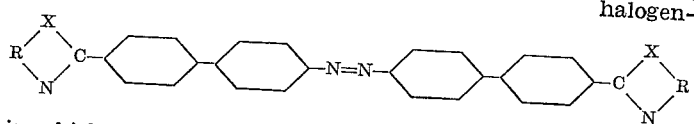

in which X stands for an element of the group consisting of sulfur and oxygen and the R's stand for radicals of the group consisting of thiophanthraquinone, anthraquinone and halogen-substituted thiophanthraquinone and halogen-substituted anthroquinone radicals the halogen in each case being of the group consisting of chlorine and bromine, at least one R being a radical of the group consisting of thiophanthraquinone and halogen-substituted thiophanthraquinone radicals, the thiophanthraquinone radicals in each case being connected to the azole ring through its benzene nucleus.

2. The azobiphenyldiazole of the formula:

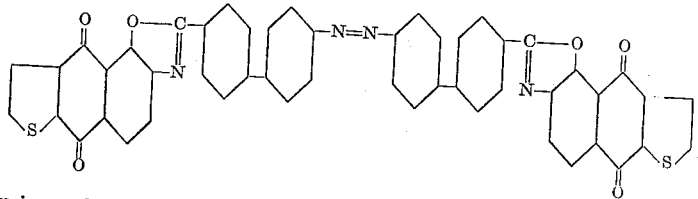

3. The azobiphenyldiazole of the formula:

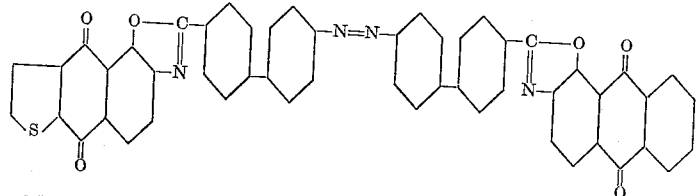

4. The azobiphenyldiazole of the formula:

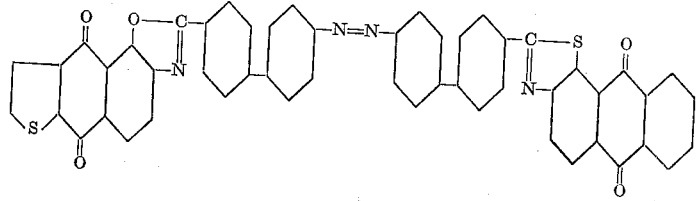

HERMAN E. SCHROEDER.
LORRAINE A. RINGROSE.

No references cited.

Certificate of Correction

Patent No. 2,559,673                                    July 10, 1951

HERMAN E. SCHROEDER ET AL.

It is hereby certified that error appears in the printed specification of the above numbered patent requiring correction as follows:

Columns 9 and 10, claim 1, for the formula reading read

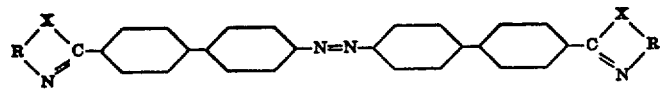

and that the said Letters Patent should be read as corrected above, so that the same may conform to the record of the case in the Patent Office.

Signed and sealed this 2nd day of October, A. D. 1951.

[SEAL]

THOMAS F. MURPHY,
*Assistant Commissioner of Patents.*